United States Patent [19]

Nair

[11] Patent Number: 4,758,492

[45] Date of Patent: Jul. 19, 1988

[54] WEAKLY ACIDIC CROSSLINKED VINYL POLYMER PARTICLES AND COATING COMPOSITIONS AND ELECTROGRAPHIC ELEMENTS AND DEVELOPERS CONTAINING SUCH PARTICLES

[75] Inventor: Mridula Nair, Rochester, N.Y.

[73] Assignee: Eastman Kodak Company, Rochester, N.Y.

[21] Appl. No.: 858,463

[22] Filed: Apr. 30, 1986

[51] Int. Cl.$^4$ .................................................. C03G 9/18
[52] U.S. Cl. ...................................... 430/114; 430/112; 524/813; 524/815; 524/824; 524/833; 526/264; 526/287; 526/318.43; 526/329.1; 526/323.2
[58] Field of Search .................. 521/29; 524/904, 824, 524/833, 813, 815; 525/934; 526/909, 329.1, 323.2, 318.43, 287, 264; 430/109, 111, 112, 114

[56] References Cited

U.S. PATENT DOCUMENTS

| | | | |
|---|---|---|---|
| 2,422,371 | 7/1947 | Schoenfeld | 526/329.1 |
| 2,744,099 | 5/1956 | Mitchell | 526/329.1 |
| 3,104,231 | 9/1963 | Fitch | 524/824 |
| 3,198,854 | 8/1965 | Warner | 526/329.1 |
| 3,285,887 | 10/1966 | de Vries | 260/90.5 |
| 3,313,733 | 4/1967 | de Vries | 252/57 |
| 3,356,659 | 12/1967 | Hagenmeyer | 526/329.1 |
| 3,361,696 | 1/1968 | Bolgiano | 524/833 |
| 3,696,082 | 10/1972 | Smith | 524/833 |
| 3,755,237 | 8/1973 | Isaacs | 526/329.1 |
| 3,788,995 | 1/1974 | Stahly et al. | 252/62.1 |
| 3,833,404 | 9/1974 | Sperling et al. | 117/63 |
| 3,849,165 | 11/1974 | Stahly et al. | 117/37 LE |
| 3,941,898 | 3/1976 | Sadamatsu et al. | 427/18 |
| 4,052,325 | 10/1977 | Santilli | 252/62.1 L |
| 4,151,146 | 4/1979 | Patella | 524/833 |
| 4,164,522 | 8/1979 | Gibbs | 525/305 |
| 4,171,275 | 10/1979 | Merrill et al. | 252/62.1 L |
| 4,199,363 | 4/1980 | Chen | 430/512 |
| 4,202,785 | 5/1980 | Merrill et al. | 430/106 |
| 4,234,467 | 11/1980 | Ryrfors | 524/824 |
| 4,268,549 | 5/1981 | Fink | 526/329.1 |
| 4,296,013 | 10/1981 | Gibbs | 524/833 |
| 4,306,009 | 12/1981 | Veillette et al. | 430/115 |
| 4,560,714 | 12/1985 | Gajria et al. | 523/409 |
| 4,708,923 | 11/1987 | Myers | 526/329.1 |

FOREIGN PATENT DOCUMENTS

| | | | |
|---|---|---|---|
| 0022982 | 1/1981 | European Pat. Off. | 526/321.1 |
| 0185431 | 6/1986 | European Pat. Off. | 526/323.2 |
| 60-137906 | 7/1985 | Japan | 524/833 |

Primary Examiner—C. Warren Ivy
Attorney, Agent, or Firm—David F. Janci

[57] ABSTRACT

The invention provides new weakly acidic crosslinked vinyl polymer particles having utility as components of coating compositions, liquid electrographic developers, and layers of electrographic elements and records.

The polymeric particles of the invention are characterized in that each particle has a weakly acidic surface and an average diameter less than one micrometer and comprises a crosslinked vinyl addition copolymer obtainable by aqueous emulsion polymerization of a mixture of monomers in the presence of a polymerization initiator.

14 Claims, No Drawings

WEAKLY ACIDIC CROSSLINKED VINYL POLYMER PARTICLES AND COATING COMPOSITIONS AND ELECTROGRAPHIC ELEMENTS AND DEVELOPERS CONTAINING SUCH PARTICLES

FIELD OF THE INVENTION

This invention relates to particles comprising crosslinked vinyl addition copolymers and to electrographic elements and liquid electrographic developers containing such particles. More particularly, the particles are submicronic in size, have weakly acidic surfaces, and are fashioned to be insoluble, swellable and dispersible in electrically insulating organic liquids of choice, yet still have a degree of crosslinking to provide resistance to solvent attack and deformation or other degradation. The particles can be prepared by aqueous emulsion polymerization and can be used as toner binders in liquid electrographic developers or as film-forming materials for various layers of electrographic elements and records.

BACKGROUND

In electrography an image comprising an electrostatic field pattern, usually of non-uniform strength, (also referred to as an electrostatic latent image) is formed on an insulative surface of an electrographic element by any of various methods. For example, the electrostatic latent image may be formed electrophotographically (i.e., by imagewise photo-induced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with an electrographic developer. If desired, the latent image can be transferred to another surface before development.

Where high resolution toner images are desired, development is typically carried out electrophoretically by contacting the latent image with a liquid electrographic developer comprising particulate toner material of very small size (e.g., less than 1 micrometer) dispersed in an electrically insulating organic carrier liquid, such as an isoparaffinic hydrocarbon liquid. The toner particles migrate to and deposit on areas of the insulative surface having relatively high or low field strength, depending upon the triboelectric characteristics of the toner material and the polarity and strength of an external electrical field usually applied across the electrographic developer and element during the development process. An imagewise deposit of toner particles is thus formed on the insulative surface and can be fixed in place on the surface by application of heat or other known methods (depending upon the nature of the toner particles to be fixed) or can be transferred in some cases to another surface to which it then can be similarly fixed.

Many types of toner materials are known to be useful in liquid electrographic developers. Such toners comprise at least a binder component (often in combination with a colorant material), in particulate form. A number of properties can be identified, which would be highly desirable to have in optimum toner binder particles. Optimum toner binder particles would be of very small size (each particle having an average diameter less than one micrometer) to enable formation of colloidal or near-colloidal dispersions and to enable high resolution imaging and capability of forming void-free smooth-surfaced deposits having good transparency, toughness, and resistance to abrasion or other degradation by solvents or other dry or oily materials. Optimum toner binder particles would be insoluble in but swellable by and, thus, dispersible in, electrically insulating organic carrier liquids of choice (e.g., isoparaffinic hydrocarbon liquids) and would exhibit good dispersion stability therein, either by themselves or with the aid of dispersing agents and stabilizers that can be dispersed or dissolved in the liquids. Optimum toner binder particles would comprise thermoplastic polymeric materials having relatively high molecular weight (e.g., at least $10^6$ g/mole) and a relatively low glass transition temperature (Tg) when in contact with and swollen by the carrier liquid, thus exhibiting an amorphous, yet still particulate, character that would enable them to bind themselves and other desirable developer addenda into seemingly continuous film deposits on insulative surfaces, either at ambient temperatures or with minimal application of heat; yet the particles would have a relatively higher Tg in the absence of the carrier liquid, so that when the carrier liquid is evaporated from deposits of the particles on a surface, and the deposits are allowed to cool, they will not flow from their original areas of deposition at room temperature; they will be fixed in place and be tough and abrasion-resistant. Optimum polymeric toner binder particles would also contain a significant degree of crosslinking in the polymeric material in order to further enhance structural integrity and solvent-resistance of the resultant deposits.

It will be readily appreciated, however, that fashioning such optimum toner binder particles having a desirable degree of the above-noted properties would be a very difficult task, especially since means for imparting some of these properties to the particles often work at cross-purposes with means for imparting other of these properties.

For example, the desire to make polymeric particles satisfactorily dispersible in certain carrier liquids by making them insoluble in but swellable by the carrier liquids, has led some workers in the prior art to fashion certain copolymers derived from a mixture of monomers. Some of the monomers in such a mixture may be chosen for their ability to form homopolymers that would be soluble or at least swellable in the carrier liquid of choice, in order to impart swellability to the copolymer intended to be produced. Other of the monomers in the mixture may be chosen for their ability to form homopolymers that would be insoluble in the carrier liquid, in order to enable the intended copolymeric particles to exhibit the necessary property of insolubility in the carrier liquid. This is the approach disclosed, for example, in U.S. Pat. Nos. 3,788,995; 3,849,165; and 4,171,275. The balancing of amounts of solubilizing and insolubilizing monomers, however, can affect more than just the dispersibility of the particles. For example, while it may be fairly simple to create particles that are insoluble, swellable, and dispersible by using a relatively high ratio of solubilizing to insolubilizing monomers, the relatively large amount of solubilizing monomers may produce a copolymer that is disadvantageously susceptible to attack by solvents that it may come into contact with during use; or the copolymer may be particularly susceptible to oily abrasion (e.g., degradation by rubbing contact with human skin and oils). The U.S. patent disclosures noted above do not address these potential problems. Those disclosures also do not suggest that the copolymers should have any crosslinking to improve structural integrity and solvent resistance. Crosslinking could inherently upset the property balance needed to achieve good dispersibility (crosslinking generally leading to decreased dispersibility). Furthermore, those disclosures teach that the copolymers should be produced in bulk by techniques such as solution polymerization, whereupon inefficient and time-consuming milling procedures are then required to achieve the desired submicrometer particle sizes. Optimum toner binder particles would be capable of being synthesized initially in the desired particle sizes, thus avoiding the need for such milling procedures.

Another approach to obtaining polymeric toner binder particles for liquid electrographic developers is disclosed in U.S. Pat. No. 4,306,009. It involves use of so-called "gelatex" particles comprising interpenetrating networks of two different polymers that are physically entangled but not chemically bonded to each other. Requirements of insolubility, swellability, and dispersibility in carrier liquids are met by fashioning one of the polymers (called a latex) to be insoluble in the carrier liquid and fashioning the other polymer (called a gel) to be soluble or "on the borderline of solubility" in the carrier.

All specific examples of the gel polymers in that patent are fashioned from mixtures of monomers that contain a relatively high percentage of solubilizing monomers. One or both of the polymers can be a copolymer and can contain trace amounts of crosslinking in order to achieve permanence of the physical entanglement. It is said that the gel polymer portion of the particles can be produced from a mix of monomers of which up to 1.2 percent by weight can comprise crosslinking vinyl monomers. Higher amounts of crosslinking apparently would detract from the gel polymer's solubilizing function and ability to be penetrated by the monomers of the insoluble latex polymer during its synthesis within the gel polymer network. The preparation of those gelatex materials involves a fairly lengthy procedure of synthesizing the gel polymer and then the latex polymer entangled within it and apparently produces a bulk material, which must then be milled to desired size. Because there is some degree of crosslinking in the gel polymer portion of the gelatex, it would be very difficult to mill the material so that the sizes of all particles would be less than one micrometer; the patent states that the final gelatex particles have a mix of sizes distributed from about 0.1 to about 1.5 micrometers. Thus, these gelatex particles are not the optimum toner binder particles noted previously herein as desirable, because they have a larger than optimum distribution of sizes, their degree of crosslinking is limited, they must be fashioned from more than one polymer, and they must be milled to final size.

It is, therefore, evident that there is a need to provide polymeric particles that could serve as optimum toner binder particles having all of the desirable characteristics noted above. That need is satisfied by the invention described in copending U.S. patent application Ser. No. 858,464, filed Apr. 30, 1986, now U.S. Pat. No. 4,708,923 (the disclosure of which is hereby incorporated herein by reference and will be hereinafter referred to, for convenience, as the Alexandrovich et al disclosure).

While the more generic invention of Alexandrovich et al does indeed provide polymeric particles having all of the optimum toner binder characteristics noted above, many of those particles require combination with dispersing aids in order to be capable of being dispersed in some organic liquids. It would be even more desirable to provide polymeric particles also having the property of being capable of being readily dispersed by themselves in many organic liquids of choice (e.g., in Isopar G ™ or heptane) and of remaining well dispersed therein for lengthy periods (e.g., at least 6 months), without the aid of dispersing and dispersion-stabilizing agents. Such particles would be desirable, because one would then be able to use them for all the purposes described in the Alexandrovich et al disclosure, without concern for whether dispersing aids, that might otherwise also need to be used, would have any adverse effects on other aspects of embodiments in which the particles are intended to be employed (e.g., adverse effects on aspects such as transparency or electrical properties). Furthermore, it has been found that even though all the particles of Alexandrovich et al can be successfully dispersed in many organic liquids with the aid of dispersing agents, in many specific cases those dispersions do not remain stable for as long as six months, even with the aid of dispersion stabilizers; i.e., in some cases they have been found to provide a shorter-than-desirable shelf life when dispersed.

The present invention avoids these shortcomings by providing crosslinked vinyl polymer particles having all of the desirable characteristics noted for the generically described particles of Alexandrovich et al and, additionally, having the further desirable characteristics of being readily dispersible by themselves in a paraffinic liquid such as heptane to form a dispersion that will be stable for at least six months under typical room conditions.

SUMMARY OF THE INVENTION

The invention provides new crosslinked vinyl polymer particles, new coating compositions containing such particles, new liquid electrographic developers containing such particles, and new electrographic elements containing one or more layers comprising such particles.

The polymeric particles of the invention are characterized in that each particle has a weakly acidic surface and an average diameter less than one micrometer and comprises a crosslinked vinyl addition copolymer obtainable by aqueous emulsion polymerization of a mixture of monomers in the presence of a polymerization initiator, wherein:

0.5–15 percent by weight of the mixture of monomers comprises polyfunctional vinyl addition-polymerizable monomers in order to form crosslinking structural units in the copolymer;

85–99.5 percent by weight of the mixture of monomers comprises monofunctional vinyl addition-polymerizable monomers selected such that:

A. 0–99.5 percent by weight of the mixture of monomers comprises monofunctional monomers, the homopolymers of which would be insoluble in but swellable by an isoparaffinic hydrocarbon liquid;

B. From 0 to less than 98.5 percent by weight of the mixture of monomers comprises monofunctional monomers, the homopolymers of which would be soluble in the isoparaffinic hydrocarbon liquid; and C. 0–60 percent by weight of the mixture of monomers comprises monofunctional monomers, the homopolymers of which would be insoluble in and not swellable by the isoparaffinic hydrocarbon liquid;

with the provisos that:

I. if more than 0 percent by weight of the mixture of monomers comprises the monomers of part C., above, then more than 0 percent by weight of the mixture of monomers comprises the monomers of part B., above;

II. if more than 9 percent by weight of the mixture of monomers comprises the monomers of part C., above, then less than 10 percent by weight of the mixture of monomers comprises the monomers of part A., above; and III. all of the polyfunctional and monofunctional monomers and amounts thereof and the polymerization initiator are selected such that:

(a) the copolymer would be insoluble in the isoparaffinic hydrocarbon liquid but would be swellable by that liquid, and (b) the weakly acidic surface of each particle is characterized in that an aqueous latex of the particles, having a concentration of about 40 grams of the particles per liter of aqueous medium, after formation by the aqueous emulsion polymerization and removal of any surfactant that may have been present during the aqueous emulsion polymerization, would exhibit a pH greater than 3 at 25° C., and in that the pKa of any acidic moiety bonded to the surface of each particle is at least 4.

In the definition of polymeric particles of the invention above, and throughout this specification, unless otherwise stated, the terms, "soluble", "insoluble", "swellable", and "pKa" should be interpreted as follows. A material is soluble in a medium, if a single homogeneous phase is formed when the material is mixed with an excess amount of the medium at 25° C. A material is insoluble in a medium, if a single homogeneous phase is not formed when the material is mixed with an excess amount of the medium at 25° C. A polymeric material is swellable by a medium, if, when mixed with an excess amount of the medium at 25° C., the material absorbs enough of the medium such that the glass transition temperature (Tg) of the material plus absorbed medium is at least 10° C. lower than the Tg of the material itself. Tg is determined by any of the methods well known in the art. The term, "pKa", is used in accordance with its commonly accepted meaning to represent the base-10 logarithm of the reciprocal of the dissociation equilibrium constant (calculated in regard to molar concentrations) of an acidic moiety in an aqueous medium at 25° C.

A coating composition in accordance with the invention comprises the polymeric particles of the invention, as defined above, dispersed in a liquid.

A liquid electrographic developer provided by the invention comprises a dispersion of the polymeric particles of the invention in an electrically insulating organic liquid.

An electrographic element provided by the invention contains one or more layers comprising the polymeric particles of the invention.

The polymeric particles of the invention have all of the characteristics previously described herein as desirable for optimum toner binder particles and, additionally, have the further desirable characteristics of being readily dispersible by themselves in a paraffinic liquid, such as heptane, to form a dispersion that will be stable for at least six months under typical room conditions. Thus, they have very advantageous utility in liquid electrographic developers for high quality imaging. Because the particles have those desirable characteristics and other properties, they also have very advantageous utility in the additional aspects of the invention defined above.

While retaining their particulate nature of sub-micron size, the particles, when coated from a liquid vehicle, can form void-free smooth-surfaced films of a seemingly continous nature having good transparency, toughness, and resistance to deformation, abrasion or other degradation caused by contact with solvents or other dry or oily materials. The liquid vehicle can be, in addition to electrically insulating organic liquids useful as carriers in electrographic developers provided by the invention, virtually any liquid in which the particles can be dispersed. It can even be the aqueous liquid in which the particles are initially formed by aqueous emulsion polymerization (so long as the particles have not been removed from the aqueous liquid, since they then would not be readily redispersible in aqueous liquids). Thus, the particles can be used as film-forming materials in various coating compositions for numerous purposes, for example, to create protective layers, smoothing layers, and electrical barrier layers, to fill in voids in other surfaces, and to overcoat and bind other materials to other surfaces. Only some of the additional utilities are embodied in the other aspects of the invention defined above (i.e., the uses as barrier layers and as overcoats for photoconductive layers and toner images in electrographic elements and records), but many others can be contemplated, for example, utility as binder materials for layers or films to be used for other than electrographic purposes or utility as toner binder materials for dry electrographic developers that contain dry particulate carrier materials or no carrier materials, rather than liquid carrier material.

Furthermore, when a coating composition (whether an electrographic developer or otherwise) is formed by dispersing the particles in a non-aqueous liquid that will swell them, and when the particles and liquid are of a nature such that the Tg of the particles changes from above to below ambient temperature as a result of the swelling, then the coating composition will have a self-fixing characteristic. That is, the coating composition can be simply applied to a surface, the liquid can be simply allowed to evaporate therefrom under ambient temperature conditions, and the particles (although still retaining their particulate character) will form a dry film that is adhered to the surface and is resistant to deformation, unwanted removal or other degradation, without the need for externally effected fixing or film-forming procedures such as application of pressure, heat, other form of radiation, etc. This applies both to imagewise coatings (e.g., as formed by electrographic development processes) and uniform continous coatings (as with most uses as film overcoats or layers).

DESCRIPTION OF PREFERRED EMBODIMENTS

The polymeric particles within the scope of the invention have been defined above in the Summary of the Invention, with reference to the mixture of monomers and the polymerization initiator useful to produce them by aqueous emulsion polymerization. That definition will hereinafter be referred to as "the broadest particle definition", as a matter of convenience in describing some preferred embodiments of the invention. All percentages stated herein are by weight unless otherwise specified.

In some preferred embodiments of the invention: 0.5-7 percent of the mixture of monomers comprises the polyfunctional vinyl addition-polymerizable monomers, 0 to less than 10 percent of the mixture comprises the monomers of part A of the broadest particle definition, 25-60 percent of the mixture comprises the monomers of part B of the broadest particle definition, and 30-60 percent of the mixture comprises the monomers of part C of the broadest particle definition.

In some other preferred embodiments of the invention: 0.5-7 percent of the mixture of monomers comprises the polyfunctional vinyl addition-polymerizable monomers, 48-93 percent of the mixture comprises the monomers of part A of the broadest particle definition, 5-50 percent of the mixture comprises the monomers of part B of the broadest particle definition, and 0-9 percent of the mixture comprises the monomers of part C of the broadest particle definition.

In some particularly preferred embodiments of the invention: 2-5 percent of the mixture of monomers comprises the polyfunctional vinyl addition-polymerizable monomers, 58-90 percent of the mixture comprises the monomers of part A of the broadest particle definition, 8-40 percent of the mixture comprises the monomers of part B of the broadest particle definition, and 0-9 percent of the mixture comprises the monomers of part C of the broadest particle definition.

While virtually any specific type of vinyl monomers encompassed by the broadest particle definition can be used to form the polymeric particles of the invention, in some preferred embodiments: monomers in accordance with part A of the broadest particle definition are selected from: alkyl acrylates, alkyl methacrylates, and vinyl alkanecarboxylates, the alkyl and alkane groups of which contain 4 to 7 carbon atoms; and styrenes having one or more alkyl substituents containing a total of 1 to 3 carbon atoms; monomers in accordance with part B of the broadest particle definition are selected from: alkyl acrylates, alkyl methacrylates, and vinyl alkanecarboxylates, the alkyl and alkane groups of which contain at least 8 carbon atoms; styrenes having an alkyl substituent containing at least 4 carbon atoms; and olefinic hydrocarbons; and monomers in accordance with part C of the broadest particle definition are selected from: styrene; styrenes having an electronegative substituent; alkyl acrylates, alkyl methacrylates, and vinyl alkanecarboxylates, the alkyl and alkane groups of which contain less than 4 carbon atoms; nitriles; and acrylic and styrene monomers having a hydroxy, amido, amino, or quaternary ammonium substituent.

Some specific examples of useful monomers in accordance with part A of the broadest particle definition are isobutyl acrylate, t-butyl acrylate, isobutyl methacrylate, t-butyl methacrylate, n-butyl methacrylate, and p-methylstyrene.

Some specific examples of useful monomers in accordance with part B of the broadest particle definition are 2-ethylhexyl acrylate, 2-ethylhexyl methacrylate, lauryl acrylate, lauryl methacrylate, 4-t-butylstyrene, isoprene, and 1,3-butadiene.

Some specific examples of useful monomers in accordance with part C of the broadest particle definition are styrene, p-chlorostyrene, m-chlorostyrene, p-nitrostyrene, isopropyl methacrylate, ethyl methacrylate, methyl methacrylate, vinyl acetate, acrylonitrile, methacrylonitrile, 2-hydroxyethyl acrylate, N-isopropylacrylamide, N-isobutoxymethylacrylamide, acrylic acid, methacrylic acid, N,N-dimethyl-N-vinylbenzylamine, N-vinylbenzyl-N,N,N-trimethylammonium chloride, N-(2-methacryloyloxyethyl)-N,N,N-trimethylammonium methosulfate, and N-vinyl-2-pyrrolidone. It should be appreciated that monomers such as acrylic acid or methacrylic acid will yield acidic moieties appended to the vinyl polymer backbones and that some of these moieties will be situated at the surfaces of the polymeric particles. However, in accordance with the broadest particle definition, such moieties have pKa's greater than 4 and can be useful to create the weakly acidic surfaces (latex pH greater than 3) described in that definition, especially if the polymerization initiator used in preparing the particles does not itself create weakly acidic surface moieties (as is discussed further below). Care should be taken, of course, not to include such monomers in the mixture in amounts great enough to lower the latex pH to 3 or below (as determined in accordance with the broadest particle definition), since that would defeat a goal of the invention, namely, to provide improved particle dispersibility and dispersion-stability in organic liquids. Conversely, although it would be possible to create particles with a surface acidity such that the latex pH, as described in the broadest particle definition, would be greater than 3, by including a very small amount of a monomer that would yield very small amounts of strongly acidic moieties (pKa less than 4) on the particle surfaces, this is not encompassed by the broadest particle definition, because the presence of any measurable amount of surface moieties with pKa less than 4 will also defeat the goal of improved particle dispersibility and dispersion-stability in organic liquids, even if the latex pH is greater than 3.

Some specific examples of useful polyfunctional vinyl addition-polymerizable monomers in accordance with the broadest particle definition are divinylbenzene, ethylene dimethylacrylate, ethylene diacrylate, and N,N'-methylenebisacrylamide.

In some particularly preferred embodiments of the invention the polymeric particles comprise a copolymer of divinylbenzene, isobutyl methacrylate, and either 2-ethylhexyl methacrylate or n-lauryl methacrylate.

While it is sufficient for the purposes of the invention that each of the polymeric particles of the invention have an average diameter less than one micrometer, particles with even smaller diameters are preferred, since they are even more dispersible, enable even higher resolution imaging when used as toner binder particles, and can be used to form images or films having even better structural integrity and resistance to oily abrasion. Accordingly, in some preferred embodiments of the invention each of the polymeric particles has an average diameter less than 0.2 micrometer. In some particularly preferred embodiments of the invention each of the polymeric particles has an average diameter of from 0.02 to 0.1 micrometer.

The polymeric particles of the invention can be prepared by techniques well-known for producing submicronic crosslinked polymeric particles in general (often referred to as microgels), such as aqueous emulsion polymerization techniques, wherein the monomers are dispersed in an aqeuous phase with emulsifying agents, and free radical initiators in the aqueous phase diffuse into micelles swollen with the monomers to initiate polymerization of the monomers within the micelles, with subsequent diffusion of more dispersed monomers into the micelles to continue polymerization of the latexes. In addition, as mentioned above, attention must be paid to the possible acidic characteristics of monomers and polymerization initiators to be used in the preparations, in order to assure that the resultant polymeric particles have the weakly acidic surface characteristics described in the broadest particle definition. These weakly acidic surface characteristics are provided by using weakly acidic initiators, weakly acidic monomers, or a combination thereof.

For example, the weakly acidic surfaces can be provided by using an initiator that will yield weakly acidic moieties (having pKa of at least 4) attached to at least one end of the polymeric chains formed. One preferred initiator, among others, is 4,4'-azobis(4-cyanovaleric acid). In aqueous emulsion polymerization media it will dissociate to form a free radical initiator that will become attached to at least one end of most polymer chains, in the form of a cyanovaleric acid moiety having a pKa of about 4.4, and thereby impart to the polymeric particle surfaces when in latex form, as described in the broadest particle definition, an acidic pH of about 5.6. Accordingly, preferred polymeric particles of the invention are characterized in that an aqueous latex of the particles, as described in proviso III (b) of the broadest particle definition, would exhibit a pH greater than 5 at 25° C.

Alternatively, as mentioned previously, a non-acidic or less acidic initiator (e.g., azobisisobutyronitrile or 2,2'-azobis(2-amidinopropane)hydrochloride) can be used, as long as a proper amount of a weakly acidic monomer (pKa of at least 4) is included, if necessary, to provide a weakly acidic pH greater than 3 to the aqueous latex, as previously defined.

Furthermore, both a weakly acidic initiator and weakly acidic monomers can be used, if desired, with care being taken not to use amounts that would yield a latex pH as low as 3 and not to use any measurable amount of an initiator or monomer that will yield acidic moieties on the polymer having a pKa less than 4.

Known methods for yielding relatively monodisperse particle size distributions may also be useful to prepare the polymeric particles of the present invention.

More details of some of the specific preparation techniques useful to create particles of this invention are presented below, immediately preceding the Examples illustrative of some preferred embodiments.

The aqueous mother latex of the polymeric particles of the invention prepared by aqueous emulsion polymerization can be used directly as a coating composition, if desired, to form film coatings comprising the polymeric particles, in accordance with some aspects of the present invention, as mentioned previously herein.

However, in other aspects of the invention (e.g., the use of the particles in liquid electrographic developers), the crosslinked polymeric particles are first isolated from the aqueous medium by well known techniques such as dialysis followed by freeze-drying or such as precipitation. It is optional, but in some cases (e.g., where a precipitation technique was used) desirable, then to wash the isolated particles with a solvent, such as aqueous methanol, to remove the last traces of residual surfactant. The particles can then be readily dispersed in a non-aqueous electrically insulating organic liquid, in which they are swellable but insoluble, to form a liquid electrographic developer or other coating composition in accordance with the invention.

In general, liquid electrographic developers in accordance with the present invention contain from about 0.005 to about 8 percent by weight of the polymeric particles of the invention, based on total developer. Although liquid developers in accordance with the invention can simply comprise the polymeric particles as self-binding toners dispersed in carrier liquids, it is often desirable to incorporate addenda in the developer such as other toner binder materials, waxes, colorants, dispersion stabilizing agents, and charging agents.

If a colorless image is desired, it is unnecessary to add any colorant. However, more usually a visibly colored image will be desired, and this is achieved by including a colorant in the developer, either mixed with or bonded to the polymeric toner binder particles of the invention or mixed with or bonded to an auxiliary toner binder. Useful results are obtained with any of numerous dyes or pigment materials, useful as toner colorants in general. A representative list of useful colorants is found, for example, in Research Disclosure, Vol. 109, May 1973, Item 10938, published by Kenneth Mason Publications, Ltd., Emsworth, Hampshire PO10 7DDm England. Colorant concentration can vary widely, but will usually be from 10 to 90 percent by weight of the total dispersed developer constituents. A preferred range is 35 to 45 percent.

The colorant in particulate form can be simply dispersed in the carrier liquid to be deposited along with the polymeric binder particles of the invention during electrophoretic development, or it can be pre-mixed with another of the possible developer constituents, such as an auxiliary binder or stabilizer polymer.

If desired, (e.g., where the intention is to produce a colored toner for an electrographic developer), the polymeric particles of the invention, while in their aqueous latex form, can be made colored by intimately associating them with a dye, for example, by latex loading techniques such as that described in U.S. Pat. No. 4,199,363 or by forming a dye in the presence of the latex particles such as by reaction of phthalaldehyde with ammonia or ammonium ion in the latex medium, which can be followed by isolation of the colored particles from the aqueous medium, as previously described.

The polymeric particles of the invention may also be dyed after isolation from the latex aqueous medium and dispersion in an appropriate non-aqueous organic liquid, such as by reaction of appropriate functional groups of the particulate copolymer with a reactive dye; for example, by reaction of aldehyde groups of the polymeric particles (provided, e.g., by including a monomer such as vinylbenzaldehyde in the original mixture of monomers) with a dye having a functional amino group, to yield polymeric particles having a dye attached through an imine linkage; or, for example, through association of acidic groups that are provided on the surface of the polymeric particles, such as carboxylic acids, with dyes containing basic groups, such as amines.

When the non-aqueous organic liquid medium of the dispersion is one suitable to serve as an electrographic developer carrier liquid, the dispersion of polymeric particles of the invention therein can readily serve as a liquid electrographic developer, usually with addition of a suitable charging agent to the liquid.

Non-aqueous organic liquids having the requisite carrier liquid characteristics of being volatile at room temperatures, being electrically insulating, having relatively low viscosity, and being capable of having appropriate toner material dispersed therein, are well known in the art of electrography. Such useful carrier liquids have a dielectric constant less than about 3 and a volume resistivity greater than about $10^{10}$ ohm-cm. and include: volatile halogenated hydrocarbon solvents, for example, fluorinated lower alkanes such as trichloromonofluoromethane and trichlorotrifluoroethane, typically having a boiling point in the range of about 2° to 55° C.; volatile isoparaffinic hydrocarbons having a boiling point range from about 145° to 185° C., such as Isopar G TM (a trademark of Exxon Corporation); volatile hydrocarbons having a major aromatic component and a boiling range from about 150° to 185° C., such as the alkylated aromatic hydrocarbon mixture, Solvesso 100 TM (a trademark of Exxon Corporation); and other liquids such as polysiloxanes, odorless mineral spirits, octane, heptane, and cyclohydrocarbons such as cyclohexane. Of these liquids, Isopar G TM is the most commonly used carrier liquid, is the preferred carrier liquid for developers of this invention, and is the particular isoparaffinic hydrocarbon liquid that was used to determine solubility and swellability characteristics in regard to the definitions of monomers and polymers herein.

As stated above, liquid electrographic developers in accordance with the invention will usually also have a charging agent dispersed or dissolved in the carrier liquid. The preferred materials providing this function are polymeric materials that also provide a stabilizing function, as described, for example, in U.S. Pat. No. 3,788,995.

A partial listing representative of preferred charging agents for use in developers of the invention includes poly(styrene-co-lauryl methacrylate-co-sulfoethyl methacrylate), poly(vinyltoluene-co-lauryl methacrylate-co-lithium methacrylate), poly(vinyltoluene-co-lauryl methacrylate-co-lithium methacrylate), poly(styrene-co-lauryl methacrylate-co-lithium methacrylate), poly(t-butylstyrene-co-styrene-co-lithium sulfoethyl methacrylate), poly(t-butylstyrene-co-lauryl methacrylate-co-lithium methacrylate), poly(-t-butylstyrene-co-lithium methacrylate), poly(-t-butylstyrene-co-lauryl methacrylate-co-lithium methacrylate-co-methacrylic acid), and poly(vinyltoluene-co-lauryl methacrylate-co-methacryloyloxyethyltrimethylammonium p-toluenesulfonate).

Other useful charge control agents include phosphonate materials described in U.S. Pat. No. 4,170,563 and quaternary ammonium polymers described in U.S. Pat. No. 4,229,513.

Various nonpolymeric charge control agents are also useful, such as the metal salts described in U.S. Pat. No. 3,417,019. Other charge control agents known in the liquid developer art can also be employed.

The amount of charge control agent used will vary depending upon the particular agent and its compatibility with the other components of the developer. It is usually desirable to employ an amount of such agent within the range of from about 0.01 to about 10.0 weight percent based on the total weight of a working-strength liquid-developer composition. The agent may be added to the liquid developer simply by dissolving or dispersing the agent in the volatile liquid-carrier vehicle at the time concentrates or melt-blends of the components are combined with the liquid-carrier vehicle to form a working-strength developer.

In some aspects of the invention a liquid electrographic developer will also comprise a wax dispersed in the electrically insulating organic carrier liquid in order to significantly enhance the dry abrasion-resistance of toner images to be formed with such developer, by electrophoretic deposit of wax particles along with the other toner constituents during development. Many waxes are known to be useful in liquid developers in the electrographic art. Preferable waxes for use in accordance with this invention are soluble in a solvent such as Solvesso 100 TM at elevated temperatures (e.g., 100° C.) but insoluble at room temperatures and are selected, for example, from polyethylene waxes, such as Shamrock S-394 TM wax (a trademark of Shamrock Chemical Corporation) or Epolene E-15 TM (a trademark of Eastman Kodak Company), and natural waxes, such as carnauba waxes, beeswax and the like.

In preparing dispersions of such waxes and the polymeric particles of the invention, the wax is added to a solvent, having the polymeric particles dispersed therein, at an elevated temperature such that the wax dissolves in the solvent. The temperature is then lowered so that the wax precipitates to form a stable particulate dispersion in the solvent along with the polymeric particles. The thusly formed wax particles are spherical and have submicronic average diameters, typically in a range of from about 0.1 to 0.5 micrometer. The polymeric particles of the invention apparently act as dispersion stabilizers for the wax particles, although the mechanism of this dispersing action is not presently understood. In liquid electrographic development the wax particles will electrophoretically migrate and deposit along with the crosslinked polymeric particles of the invention and any colorants that may also be included. The resultant toner images exhibit increased scratch-resistance, compared to toner images not containing wax.

Alternatively, as discussed further below, the wax can be melt-blended into other toner binder materials, such as polyesterionomer binders, which can also be included in the liquid developer.

Waxes can be usefully included in developers in accordance with the invention in concentrations ranging from trace amounts to about one part per part by weight of binder materials included in the developer. Even higher concentrations of wax may be useful but may be difficult to disperse in the carrier liquid.

Although, as mentioned, the crosslinked polymeric particles of the invention seem to aid in dispersing wax particles in carrier liquids, it is also useful in some cases to include other known waxdispersing aids in the developers. One such dispersing aid, found to be particularly useful with polyethylene waxes is poly(ethylene-co-vinyl acetate) 72/78, available as Elvax 210 TM (a trademark of E. I. duPont de Nemours and Compony). Such a dispersion aid may be included in any useful amount, in some cases even in as high a concentration as one part per part by weight of the wax.

As mentioned above, liquid electrographic developers in accordance with this invention can include other toner binder materials dispersed in the carrier liquid in addition to the crosslinked polymeric particles of the invention. Any known polymeric toner binder material can be used, so long as it can be dispersed without dissolving in the carrier liquid of choice in the form of particles having average diameters less than one micrometer (in keeping with one of the goals of the present invention, i.e., to enable high resolution imaging). Proportions of the crosslinked polymeric particles of the invention and additional polymeric toner binder materials can be varied as desired. Useful developers can be formed wherein either of these components constitutes the major or minor portion of binder material in the developer.

Preferred polymeric toner binder materials to be used in combination with the crosslinked vinyl polymeric particles of the invention are polyesters comprising recurring diol-derived units and recurring diacid-derived units.

More-preferred polyester binders have one or more aliphatic, alicyclic or aromatic dicarboxylic acid-derived recurring untis, and recurring diol-derived units of the formula:

wherein:

$G_1$ represents straight- or branched-chain alkylene having about 2 to 12 carbon atoms or cycloalkylene, cycloalkylenebis(oxyalkylene) or cycloalkylenedialkylene.

Especially preferred polyesters are those which have up to 35 mole percent (based on the total moles of diacid units) of ionic diacid-derived units of the structure:

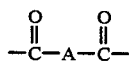

wherein:

A represents sulfoarylene, sulfoaryloxyarylene, sulfocycloalkylene, arylsulfonyliminosulfonylarylene, iminobis(sulfonylarylene), sulfoaryloxysulfonylarylene and sulfoaralkylarylene or the alkali metal or ammonium salts thereof. The diol- or diacid- derived units set forth above can be unsubstituted or substituted as desired.

Such preferred polyester resins include, for example, the polyester ionomer resins disclosed in U.S. Pat. No. 4,202,785 and the linear polyester described in U.S. Pat. No. 4,052,325, the disclosures of which are hereby incorporated herein by reference.

Such polyester binder materials can be included in liquid electrographic developers of the invention simply by pulverizing bulk polyester to the desired size and dispersing the particles in the desired proportion in carrier liquid along with the other components.

Alternatively, and preferably, one or more of the other developer components (e.g., colorant, wax and-/or dispersing agent for the wax, but not the charge agent and not the crosslinked polymeric particles of the invention) can be combined with the polyester binder material (e.g., by solution-blending or melt-blending) before pulverization and dispersion thereof in the carrier liquid. Preferably, this is accomplished by melt-blending, i.e., by melting the polyester and blending the other desired components therewith, then cooling to solidify and pulverizing the mixture to form dry particles of the mixture. This insures that the other components will be as easily dispersible in carrier liquid as the polyester particles (since they are included therein) and insures that the other components will be evenly deposited with the polyester binder during electrophoretic development processes.

Liquid developers in accordance with the aspects of the invention described above can be used in any of the well known processes of electrophoretic imaging to develop toner images from electrostatic latent images carried on a surface of any of various elements well known for that purpose in the electrographic art, such as electrophotographic elements, dielectric recording elements, or image-receiving elements.

In other aspects of the invention, previously defined herein, the crosslinked polymeric particles of the invention are used to form one or more of various layers of electrographic elements or records, e.g., to form overcoats for toner images, overcoats for photoconductive surfaces, and/or electrical barrier layers.

The crosslinked polymeric particles of the invention can be used to form a protective uniform coating over any type of toner image on a surface and thus impart improved abrasion-resistance to the image. Because the particles of the invention form void-free, smooth-surfaced films having good transparency, the visual appearance of the toner image is not adversely affected. Any of the coating compositions of the invention described above (e.g., the aqueous latexes formed in preparing the particles of the invention or the dispersions of the particles in non-aqueous electrically insulating organic liquids) can be used for this purpose, by simply applying a uniform coating of the composition over the imagewise toned surface and allowing or causing the liquid medium to evaporate from the composition. In cases where a dispersion of the particles in electrically insulating liquid is used, it is convenient and more efficient to also apply an electrical bias across the coated liquid and toned surface by known means to cause the particles to electrophoretically migrate to the surface. The addenda described above as useful in liquid developers of the invention (e.g., charging agents, waxes, and wax-dispersing aids) can also be included advantageously in such coating compositions to assure uniform coatings and provide even better abrasionresistance. Even colorants can be included in such coating compositions, if it is desired to provide a uniform tint over the toned surface.

Similarly, the coating compositions of the invention can be used to form a protective uniform coating, comprising the crosslinked polymeric particles of the invention, (and any desired addenda as described above) on any surface to which it is intended later to apply a toner image. It is especially advantageous to apply such a protective overcoat to the outermost surface of any photoconductive layer comprising an outermost layer of any known reusable photoconductive element in order to extend its useful life, by providing dry and oily abrasion-resistance thereto. Furthermore, most known photoconductive layers have somewhat irregular surfaces comprising small voids, in which applied developer can become trapped, eventually causing stains or chemical degradation that impair their performance. The protective overcoats of the present invention provide smoother, more void-free surfaces than any previously known overcoats, and thus provide a better means for avoiding such problems.

In another aspect of the invention, a coating composition of the invention can be used to provide an electrical barrier layer, comprising the crosslinked polymeric particles of the invention, sandwiched between an electrically conductive substrate and a photoconductive layer of an electrophotographic element.

Electrical barrier layers, in general, have been described in the prior art for use in electrophotographic elements to prevent unwanted discharge of a charged photoconductive layer, in the absence of activating radiation, such discharge being caused by injection of charges into the photoconductive layer from an electrically conductive substrate, e.g., a substrate coated with cuprous iodide. Such unwanted discharge is often referred to as dark decay. See, for example, U.S. Pat. Nos. 3,554,742 and 3,640,708. Cellulose nitrate has been described in the past as a useful barrier layer material to be interposed between the conductive substrate and photoconductive layer or layers. However, there are problems associated with such use. Cellulose nitrate tends to bleach some dyes often contained in photoconductive layers, and it cannot be simultaneously coated along with an electrically conductive layer such as cuprous iodide, since cuprous iodide is conveniently solvent-coatable, but simultaneous coating of a barrier layer over it would require a barrier material coatable from a hydrocarbon medium, which cellulose nitrate is not.

The crosslinked polymeric particles of the present invention, however, provide good electrical barrier layer properties, do not tend to bleach dyes in photoconductive layers, and can be dispersed in and coated in conjunction with a hydrocarbon liquid such as heptane. The present polymeric particles thus provide a superior substitute for cellulose nitrate barrier layers.

The polymeric particles of the invention were in fact successfully employed in all of the aspects of the invention described above, i.e., as components of liquid electrographic developers, overcoats for toner images, overcoats for photoconductive layers, and electrical barrier layers in electrophotographic elements.

The following preparation techniques and examples are presented to further illustrate some preferred embodiments of the invention. In all preparations and examples unless otherwise noted, monomers were used as received from suppliers without removal of any inhibitors included, and relative proportions following copolymer names represent parts of the respective monomers per 100 parts by weight of the total mixture of monomers used to prepare the copolymer. Latex pH's were measured in accordance with proviso III (b) of the broadest particle definition.

Preparation A used to prepare crosslinked vinyl polymeric particles of Examples 1-16.

A 1-liter 3-necked flask equipped with a stirrer and condenser was charged with 200 g of deaerated distilled water and 2.76 g of surfactant Alipal CO436 TM (an ammonium salt of a sulfate ester of an alkylphenoxypoly(ethyleneoxy)ethanol, trademarked by and available from GAF Corp., USA) and placed in an 80° C. bath. To the flask was added, over a 1-hour period, a well stirred mixture of 200 g deaerated distilled water, 1.65 g Alipal CO436 TM, 100 g of the mixture of monomers, and 0.75 g 4,4'-azobis(4-cyanovaleric acid) initiator. The contents of the flask were stirred at a moderate rate during the addition, and the stirring continued for 3 hours under nitrogen. The latex was cooled to room temperature and filtered to remove any coagulum. The latex was subsequently precipitated using an equal volume of isopropanol or acetone. The polymer was filtered, washed thoroughly with 2 liters of 4/1 methanol/water and dried in vacuum at 50° C. overnight.

Preparation B used to prepare the crosslinked vinyl polymeric particles of Examples 17-19.

Distilled water (14.0 kg) and 114.8 g of hexadecyltrimethylammonium bromide surfactant were added to a reactor with stirring. While heating to 80° C. on automatic control, the reactor was degassed by evacuating three times to a boil and replacing with nitrogen each time. As the reactor contents were heated to 80° C., 7 kg of the mixture of monomers, 233.8 g of hexadecyltrimethylammonium bromide, and 14.0 kg of distilled water were added to a header tank with stirring.

With the reactor temperature at 80° C., 70 g of 4,4'-azobis(4-cyanovaleric) acid initiator was added. The header tank mixture was then pumped into the reactor over ~90 min. After the pumping was completed, the reaction was maintained at 80° C. for 3 hours.

The contents were cooled to room temperature and filtered through a 5 $\mu$m filter. Acetone (34.25 kg) was rapidly added to 34.25 kg of the latex with vigorous stirring in an 80 liter tilt kettle at room temperature. Stirring was continued for 5 minutes after addition of acetone. the liquors were removed through a submerged filter cage covered with a cheesecloth bag. The precipitate was washed four times with a 4/1 methanol/distilled water mixture. The precipitate hardened with the first wash. The washed solid was then dried in a vacuum oven at 45° C. for 24 hours.

EXAMPLES 1-19

In each of these examples, below, cross-linked vinyl polymeric particles in accordance with the invention were prepared as indicated. For purposes of comparison, the preparation in each of the examples was repeated, but using potassium persulfate as the initiator instead of 4,4'-azobis(4-cyanovaleric acid). During polymerization, potassium persulfate yielded sulfonic acid moieties bonded to at least one end of most polymeric backbones. Such sulfonic acid moieities have a pKa less than 2 and, thus, yielded polymeric particles outside of the scope of the invention (even though, in most cases, the pH of the aqueous latex in accordance with proviso III (b) of the broadest particle definition was greater than 3). In contrast, the polymeric particles of each example, prepared in accordance with the invention, contained surface cyanovaleric acid moieties having a pKa of about 4.4, and the pH's of the latexes of those particles, in accordance with proviso III (b) of the broadest particle definition, ranged from 3.6 to 5.6 (in Example 10, the polymeric particles in accordance with the invention also contained methacrylic acid moieties having a pKa of about 4.6).

The polymeric particles of each of Examples 1-19, prepared in accordance with the invention, were stirred into heptane at a concentration of 15 percent particles by weight of total dispersion. In each case the particles readily dispersed in the heptane, and the dispersion remained stable for more than 6 months, without the inclusion of any dispersing aids or dispersion stabilizers.

In contrast, the persulfate-initiated particles prepared to compare to each example (i.e., particles outside the scope of the invention) could in no case be dispersed by themselves in heptane, let alone create a dispersion thereby that would be stable for more than six months.

This illustrates the unexpectedly superior dispersibility and dispersion-stability of particles of the invention in paraffinic liquids such as heptane.

EXAMPLE 1

Poly(isobutyl methacrylate-co-2-ethylhexyl methacrylate-co-divinylbenzene), 72/25/3, was prepared according to Preparation A. The pH of an aqueous latex of the particles in accordance with proviso III (b) of the broadest particle definition was 5.6. The average diameter of the average particle was 0.09 μm, and each particle had an average diameter less than 0.1 μm.

EXAMPLE 2

Poly(isobutyl methacylate-co-2-ethylhexyl methacrylate-co-divinylbenzene), 72/26/2, was prepared according to Preparation A. Latex pH was 5.6. Each particle had an average diameter less than 0.1 μm.

EXAMPLE 3

Poly(isobutyl methacrylate-co-2-ethylhexyl methacrylate-co-divinylbenzene), 72/27/1, was prepared according to Preparation A. Latex pH was 5.6. Each particle had an average diameter less than 0.1 μm.

EXAMPLE 4

Poly(isobutyl methacrylate-co-2-ethylhexyl methacrylate-co-divinylbenzene), 72/27.5/0.5, was prepared according to Preparation A. Latex pH was 5.6. Each particle had an average diameter less than 0.1 μm.

EXAMPLE 5

Poly(isobutyl methacrylate-co-2-ethylhexyl methacrylate-co-divinylbenzene), 74.5/25/0.5, was prepared according to Preparation A. Latex pH was 5.6. Each particle had an average diameter less than 0.1 μm.

EXAMPLE 6

Poly(isobutyl methacrylate-co-2-ethylhexyl methacrylate-co-divinylbenzene), 79.5/20/0.5, was prepared according to Preparation A. Latex pH was 5.6. Each particle had an average diameter less than 0.1 μm.

EXAMPLE 7

Poly(isobutyl methacrylate-co-2-ethylhexyl methacrylate-co-divinylbenzene), 62/35/3, was prepared according to Preparation A. Latex pH was 5.6. Each particle had an average diameter less than 0.1 μm.

EXAMPLE 8

Poly(isobutyl methacrylate-co-2-ethylhexyl methacrylate-co-ethyl methacrylate-co-divinylbenzene), 72/25/2.5/0.5, was prepared according to Preparation A. Latex pH was 5.6. Each particle had an average diameter less than 0.1 μm.

EXAMPLE 9

Poly(isobutyl methacrylate-co-2-ethylhexyl methacrylate-co-ethyl methacrylate-co-divinylbenzene), 72/25/2/1, was prepared according to Preparation A. Latex pH was 5.6. Each particle had an average diameter less than 0.1 μm.

EXAMPLE 10

Poly(isobutyl methacrylate-co-2-ethylhexyl methacrylate-co-divinylbenzene-co-methacrylic acid), 71.5/25/3/0.5, was prepared according to Preparation A. Latex pH was 3.6. Each particle had an average diameter less than 0.1 μm.

EXAMPLE 11

Poly(isobutyl methacrylate-co-lauryl methacrylate-co-divinylbenzene), 72/25/3, was prepared according to Preparation A, except that sodium lauryl sulfate was used as the surfactant, rather than Alipal CO436 TM. Latex pH was 5.6. Each particle had an average diameter less than 0.1 μm.

EXAMPLE 12

Poly(p-t-butylstyrene-co-2-ethylhexyl methacrylate-co-divinylbenzene), 72/25/3, was prepared according to Preparation A. Latex pH was 5.6. Each particle had an average diameter less than 0.1 μm.

EXAMPLE 13

Poly(p-t-butylstyrene-co-2-ethylhexyl methacrylate-co-divinylbenzene), 48/50/2, was prepared according to Preparation A. Latex pH was 5.6. Each particle had an average diameter less than 0.1 μm.

EXAMPLE 14

Poly(p-t-butylstyrene-co-2-ethylhexyl methacrylate-co-N-vinyl-2-pyrrolidone-co-divinylbenzene), 72/21/5/2, was prepared according to Preparation A, except that the surfactant employed was a mixture of Alipal CO436 TM and Olin Surfactant 10G TM (a p-isononylphenoxypolyglycidol surfactant, trademarked by and available from Olin Chemical Co., USA). Latex pH was 5.6. Each particle had an average diameter less than 0.1 μm.

EXAMPLE 15

Poly(isobutyl methacrylate-co-p-t-butylstyrene-co-divinylbenzene), 72/25/3, was prepared according to Preparation A. Latex pH was 5.6. Each particle had an average diameter less than 0.1 μm.

EXAMPLE 16

Poly(isobutyl methacrylate-co-t-butylstyrene-co-divinylbenzene), 72/26/2, was prepared according to Preparation A. Latex pH was 5.6. Each particle had an average diameter less than 0.1 μm.

EXAMPLE 17

Poly{isobutyl methacrylate-co-2-ethylhexyl methacrylate-co-divinylbenzene-co-N-[2-(methacryloyloxy)ethyl]-N,N,N,trimethylammonium methosulfate}, 71.5/25/3/0.5, was prepared according to Preparation B. Latex pH was 5.7. Each particle had an average diameter less than 0.1 μm.

EXAMPLE 18

Poly{isobutyl methacrylate-co-2-ethylhexyl methacrylate-co-divinylbenzene-co-N-[2-(methacryloyloxy)ethyl]-N,N,N,trimethylammonium methosulfate}, 70.5/25/4/0.5, was prepared according to Preparation B. Latex pH was 5.7. Each particle had an average diameter less than 0.1 μm.

EXAMPLE 19

Poly{isobutyl methacrylate-co-2-ethylhexyl methacrylate-co-divinylbenzene-co-N-[2-(methacryloyloxy)ethyl]-N,N,N-trimethylammonium methosulfate}, 71.75/25/3/0.25, was prepared according to Preparation B. Latex pH was 5.7. Each particle had an average diameter less than 0.1 μm.

The invention has been described in detail with particular reference to certain preferred embodiments thereof. However, it should be appreciated that variations and modifications can be effected within the spirit and scope of the invention.

What is claimed is:

1. A plurality of polymeric particles, each particle having a weakly acidic surface and an average diameter less than one micrometer and comprising a crosslinked vinyl addition copolymer obtained by aqueous emulsion polymerization of a mixture of monomers in the presence of a polymerization initiator wherein:

0.5–15 percent by weight of the mixture of monomers comprises vinyl addition-polymerizable monomers capable of forming crosslinking structural units in the copolymer during the aqueous emulsion polymerization and selected from: divinylbenzene, ethylene dimethacrylate, ethylene diacrylate, and N,N'-methylenebisacrylamide;

85–99.5 percent by weight of the mixture of monomers comprises vinyl addition-polymerizable monomers selected such that:

A. 0–99.5 percent by weight of the mixture of monomers comprises monomers selected from:
alkyl acrylates, alkyl methacrylates, and vinyl alkanecarboxylates, the alkyl and alkane groups of which contain 4 to 7 carbon atoms; and styrenes having one or more alkyl substituents containing a total of 1 to 3 carbon atoms;

B. from 0 to less than 98.5 percent by weight of the mixture of monomers comprises monomers selected from:
alkyl acrylates, alkyl methacrylates, and vinyl alkanecarboxylates, the alkyl and alkane groups of which contain at least 8 carbon atoms; and styrenes having an alkyl substituent containing at least 4 carbon atoms; and C. 0–60 percent by weight of the mixture of monomers comprises monomers selected from:
styrene; styrenes having an electronegative substituent; alkyl acrylates, alkyl methacrylates, and vinyl alkanecarboxylates, the alkyl and alkane groups of which contain less than 4 carbon atoms; nitriles; and acrylic and styrene monomers having a hydroxy, amido, amino, or quaternary ammonium substituent;

with the provisos that:

I. if more than 0 percent by weight of the mixture of monomers comprises the monomers of part C., above, then more than 0 percent by weight of the mixture of monomers comprises the monomers of part B., above;

II. if more than 9 percent by weight of the mixture of monomers comprises the monomers of part C., above, then less than 10 percent by weight of the mixture of monomers comprises the monomers of part A., above; and III. the monomers and amounts thereof and the polymerization initiator are selected such that the weakly acidic surface of each particle is characterized in that an aqueous latex of the particles, having a concentration of about 40 grams of the particles per liter of aqueous medium, after formation by the aqueous emulsion polymerization and removal of any surfactant that may have been present during the aqueous emulsion polymerization, would exhibit a pH greater than 3 at 25° C., and in that the pKa of any acidic moiety bonded to the surface of each particle is at least 4.

2. The polymeric particles of claim 1, wherein:
0.5–7 percent by weight of the mixture of monomers comprises the vinyl addition-polymerizable monomers capable of forming crosslinking structural units in the copolymer during the aqueous emulsion polymerization;
from 0 to less than 10 percent by weight of the mixture of monomers comprises the monomers of part A of claim 1;
25–60 percent by weight of the mixture of monomers comprises the monomers of part B of claim 1; and
30–60 percent by weight of the mixture of monomers comprises the monomers of part C of claim 1.

3. The polymeric particles of claim 1, wherein:
0.5–7 percent by weight of the mixture of monomers comprises the vinyl addition-polymerizable monomers capable of forming crosslinking structural units in the copolymer during the aqueous emulsion polymerization;
48–93 percent by weight of the mixture of monomers comprises the monomers of part A of claim 1;
5–50 percent by weight of the mixture of monomers comprises the monomers of part B of claim 1; and
0–9 percent by weight of the mixture of monomers comprises the monomers of part C of claim 1.

4. The polymeric particles of claim 1, wherein:
2–5 percent by weight of the mixture of monomers comprises the vinyl addition-polymerizable monomers capable of forming crosslinking structural units in the copolymer during the aqueous emulsion polymerization;
58–90 percent by weight of the mixture of monomers comprises the monomers of part A of claim 1;
8–40 percent by weight of the mixture of monomers comprises the monomers of part B of claim 1; and
0–9 percent by weight of the mixture of monomers comprises the monomers of part C of claim 1.

5. The polymeric particles of claim 1, comprising a copolymer of divinylbenzene, isobutyl methacrylate, and either 2-ethylhexyl methacrylate or n-lauryl methacrylate.

6. The polymeric particles of claim 1, wherein a measured glass transition temperature of the particles when not in contact with a liquid is higher than ambient temperature, but wherein the measured glass transition temperature of the particles would be lower than ambient temperature if they were swollen with an isoparaffinic hydrocarbon liquid.

7. The polymeric particles of claim 1, wherein each particle has an average diameter less than 0.2 micrometer.

8. The polymeric particles of claim 1, wherein each particle has an average diameter of from 0.02 to 0.1 micrometer.

9. The polymeric particles of claim 1, wherein the weakly acidic surface of each particle is characterized in that an aqueous latex of the particles, as described in proviso (III) of claim 1, would exhibit a pH greater than 5 at 25° C.

10. A coating composition comprising the polymeric particles of claim 1 dispersed in a liquid.

11. A composition comprising a dispersion of the polymeric particles of claim 1 in a non-aqueous liquid.

12. A liquid electrographic developer comprising a dispersion of the particles of claim 1 in an organic liquid having a dielectric constant less than about 3 and a volume resistivity greater than about $10^{10}$ ohm cm.

13. An electrographic element comprising a photoconductive layer and an electrically conductive substrate and containing a layer comprising the particles of claim 1.

14. The polymeric particles of claim 1, wherein:
- 0.5–3 percent by weight of the mixture of monomers comprises divinylbenzene,
- 62–79.5 percent by weight of the mixture of monomers comprises isobutyl methacrylate,
- 20–35 percent by weight of the mixture of monomers comprises 2-ethylhexyl methacrylate or lauryl methacrylate,
- 0–2.5 percent by weight of the mixture of monomers comprises ethyl methacrylate,
- the average diameter of each of the particles is less than 0.1 micrometer, and
- an aqueous latex of the particles as described in proviso III of claim 1, would exhibit a pH of 5.6 at 25° C.

* * * * *